United States Patent [19]

Baumann et al.

[11] 3,833,276

[45] Sept. 3, 1974

[54] LUBRICATING MEANS FOR A DYNAMOELECTRIC MACHINE END SHIELD HOUSING

[75] Inventors: Frederick William Baumann, Scotia; Albert Rayner, Albany, both of N.Y.

[73] Assignee: General Electric Company, Schenectady, N.Y.

[22] Filed: Apr. 12, 1973

[21] Appl. No.: 350,602

[52] U.S. Cl. ................................. 308/187, 310/90
[51] Int. Cl. ...................... H02k 5/16, F16c 33/78
[58] Field of Search ........ 310/90; 184/1 D; 308/187

[56] References Cited
UNITED STATES PATENTS

| | | | |
|---|---|---|---|
| 2,164,449 | 7/1939 | Delaval-Crow | 308/187 |
| 2,548,644 | 4/1951 | Wightman | 308/187 |
| 2,959,457 | 11/1960 | Szymalak | 308/187 |
| 3,112,417 | 11/1963 | Tamm | 310/90 |

FOREIGN PATENTS OR APPLICATIONS 118,090   4/1927   Switzerland.......................... 310/90

Primary Examiner—Manuel A. Antonakas
Attorney, Agent, or Firm—Vale P. Myles

[57] ABSTRACT

A dynamoelectric machine end shield housing is provided with a pair of lubricant receiving passageways integrally cast into the housing and extending from spaced-apart points on the periphery thereof to an inner lubricant well surface adjacent a bearing mounted in the housing. A lubricant baffle is mounted on the inner lubricant well surface to restrict flow of lubricant in a path parallel to the shaft bearing mounted in the end shield. The outer ends of said passageways are readily accessible from a single side of the machine and means are provided in combination with the above-mentioned baffle that enables the lubricating system to be quickly adapted for reversal of grease fitting and grease drain.

9 Claims, 6 Drawing Figures

LUBRICATING MEANS FOR A DYNAMOELECTRIC MACHINE END SHIELD HOUSING

BACKGROUND OF THE INVENTION

In prior art dynamoelectric machines, such as integral horsepower electric motors, it is well known to provide lubricant receiving passageways on the end shield housing of the machines so that their drive shaft bearings can be easily lubricated. Typically, such lubricant receiving passageways are formed by drilling holes in opposite sides of a hub portion of the end shield housing. A grease inlet fitting or other conventional one-way grease valve is usually mounted in the top passageway and a stop plug or other sealing means is provided in the lower, or lubricant relief, passageway. Examples of these types of prior art structures are shown in U.S. Pat. Nos. 2,754,579–Shewmon and 3,112,417–Tamm. Such prior art motor lubricating means have several characteristic features that have been found to pose problems in given applications of the machinery. In general, these problems fall into the following three categories: (1) the lubricating means are not always readily accessible for maintenance or repair during operation, (2) the lubricating means may cause additional motor noise or vibration due to their characteristic structure and arrangement, (3) the lubricating means may not provide optimum bearing lubrication.

More specifically, it has been found that in many motor installations, motors are mounted adjacent to walls or are used with other access restricting fixtures, such as pulleys mounted on the motor drive shaft immediately adjacent to the lubricating passageways, so that it is difficult, if not impossible, to gain access to the lubricating passageways without moving or partially disassembling the machine. This disadvantage of prior art machines is due primarily to two factors; namely, the location of the lubricating passageways near the hub portions of the end shields, and the conventional location of lubricant inlet and release passageways on essentially opposite sides of the motor drive shaft.

In regard to the problem of increased noise caused by the location of lubricant receiving passageways on the hub portion of motor end shields, it has been found that auxiliary access tubes are frequently mounted on the exterior surface of the end shields to extend the passageways to points adjacent the periphery of the machine where they are more readily accessible. These tubular extensions tend to be vibrated by motor operation, thus causing substantial increase in the noise levels produced by the motors during normal operation. In addition, these extension tubes may create other disadvantages such as unaesthetic appearance considerations and possible lubricant leakage problems around the joints necessary between them and the associated passageways in the hub portions of the motors.

Finally, with respect to the lubricating efficiency of prior art lubricating passageway arrangements, heretofore it was generally believed that it was necessary to have the lubricant relief passageway disposed essentially on the opposite side of the motor drive shaft from the lubricant inlet passageway, in order to assure flow of the lubricant completely around the drive shaft bearing. Thus, even though such diametrically opposed arrangements caused problems with regard to accessibility to both passageways, alternative arrangements were not provided. As noted above, it is frequently desirable to have convenient access to both the lubricant inlet passageway and the lubricant relief passageway from a single side of an installed motor, so that access to the remaining sides of the motor need not be maintained clear. At the same time, such convenience of access must not unduly impair the lubricating efficiency of the bearing lubricating system. The present invention is intended to afford such desirable objectives as well as additional advantages and improvements over the prior art.

OBJECTS OF THE INVENTION

A primary object of the present invention is to provide a commercially feasible dynamoelectric machine end shield structure having lubricating means that are free from the problems and the disadvantages of prior art lubricating means outlined above.

Another object of the invention is to provide lubricating means for a dynamoelectric machine end shield structure that afford optimum lubricating efficiency for the drive shaft bearing of the machine while at the same time being readily accessible for maintenance and inspection.

A further object of the invention is to provide a dynamoelectric machine end shield housing having lubricant receiving means integrally molded therein so that the lubricant receiving means are conveniently accessible at the periphery of the end shield housing.

Still another object of the invention is to provide a dynamoelectric machine end shield housing with lubricating means that do not produce undesirable noise or vibration during normal operation of the machine.

A still further object of the invention is to provide a dynamoelectric machine lubricating means that is easily adjustable to enable the machine to be driven in either a forward or reverse direction without impairing the lubricating efficiency of the lubricating means.

Additional objects and advantages of the invention will become apparent to those skilled in the art from the description of it that follows taken in conjunction with the accompanying drawings.

SUMMARY OF THE INVENTION

In one preferred embodiment of the invention, an electric motor end shield housing is provided with a pair of lubricant receiving passageways that extend from spaced-apart points on the periphery of the end shield to a lubricant receiving well within a hub portion of the end shield. The spaced-apart points at the ends of the passageways on the periphery of the housing are angularly displaced by less than 120° so that they are both readily accessible from a single side of the motor. In order to assure optimum lubricating efficiency of the lubricating means of the invention, a lubricant baffle member is mounted within the lubricant receiving well between the two lubricant passageways. This baffle operates to restrict the flow of lubricant in a path of least distance to the drain, thereby to cause the lubricant in the well to flow in the only alternate path, completely around the drive shaft bearing. The restricting effect of the lubricant baffle is controlled to assure that the entire drive shaft bearing is directly exposed to lubricating grease, rather than allowing only the portion of the bearing between the two lubricant receiving passageways to be directly contacted by such grease.

DESCRIPTION OF A PREFERRED EMBODIMENT

Figure 1:
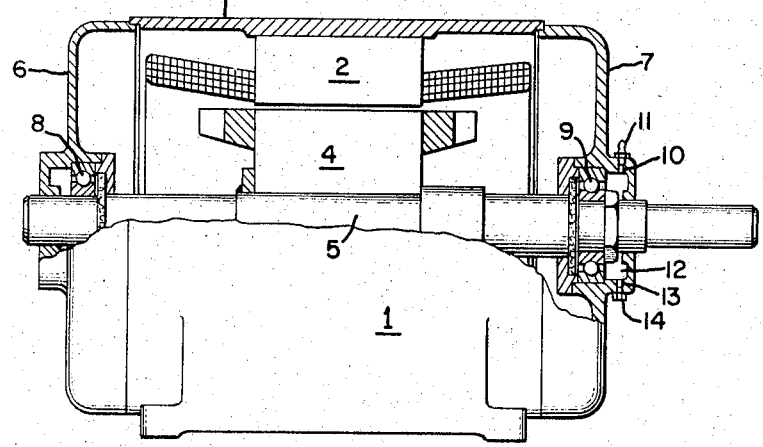
FIG. 1 is a side elevation view, partly in cross-section, of a dynamoelectric machine having a drive shaft bearing lubricating means of a type that is exemplary of prior art lubricating means for such machines.

Before describing the novel features of the present invention, brief reference will be made to FIG. 1 wherein an example of a prior art type of electric motor lubricating means is shown, in order to quickly orient the reader with respect to the present state of the art. In FIG. 1 there is shown a conventional electric motor 1 having a stator 2 rigidly mounted in a generally cylindrical metal housing 3. A rotor 4 is supported on a drive shaft 5 for rotation in a conventional manner concentrically within the stator 2. A pair of bell type end shields 6 and 7 are mounted in fixed positions on opposite ends of the central housing portion 3 in a well known manner. The end shield 6 and 7 are provided respectively with shaft supporting bearings 8 and 9 mounted in the hub portions thereof. A lubricating passageway 10 is shown extending through the hub portion of end shield 7 from a grease fitting 11 to a lubricant receiving well 12 that is situated adjacent to the bearing 9. A lubricant relief passageway 13 is situated in the bottom portion of the hub of end shield 7 and is sealed with a conventional threaded plug 14.

It will be appreciated by those skilled in the art that in a normal application of the lubricating means shown in conjunction with the motor depicted in FIG. 1, the plug 14 will be in its sealing position during motor operation. In fact, in some motors of the type shown, no such lubricant relief plug is provided. In lieu of such a plug alternative, pressure responsive means may be built into the hub portion of the shield to allow some lubricant to escape from the chamber 12 along the drive shaft 5 of the motor.

Insofar as the lubricating means of the prior art type structure shown in FIG. 1 are relevant to the present invention, it should be noted that the lubricant passageways 10 and 13 terminate relatively close to the drive shaft 5; therefore, if a pulley or other obstruction is mounted closely adjacent to the end shield 7, it may be very difficult to gain ready access to the grease fitting 11 or the removable plug 14. Alternatively, if an extension tube is mounted over either of the passageways so that the fitting 11 or the plug 14 may be mounted closer to the periphery of the end shield 7, these passageways would necessarily be external to the surface of the end shield 7 and therefore subject to vibration and the creation of an attendant noise problem. Moreover, it will be noted that in order to gain access to both the grease fitting 11 and the plug 14, it is necessary to preserve access to both the top and the bottom of the motor 1 during its application. Since the release port 13 is located diametrically opposite to the lubricant inlet passageway 10, it will be necessary for lubricant to flow substantially completely around the drive shaft 5 on one side or the other thereof; however, there is no assurance that equal flows of lubricant will take place on both sides of the shaft. It will be noted that there is no baffle provided in the lubricant reservoir 12 of this prior art type structure to assure optimum movement of lubricant therein with respect to the bearing 9.

Figure 2:
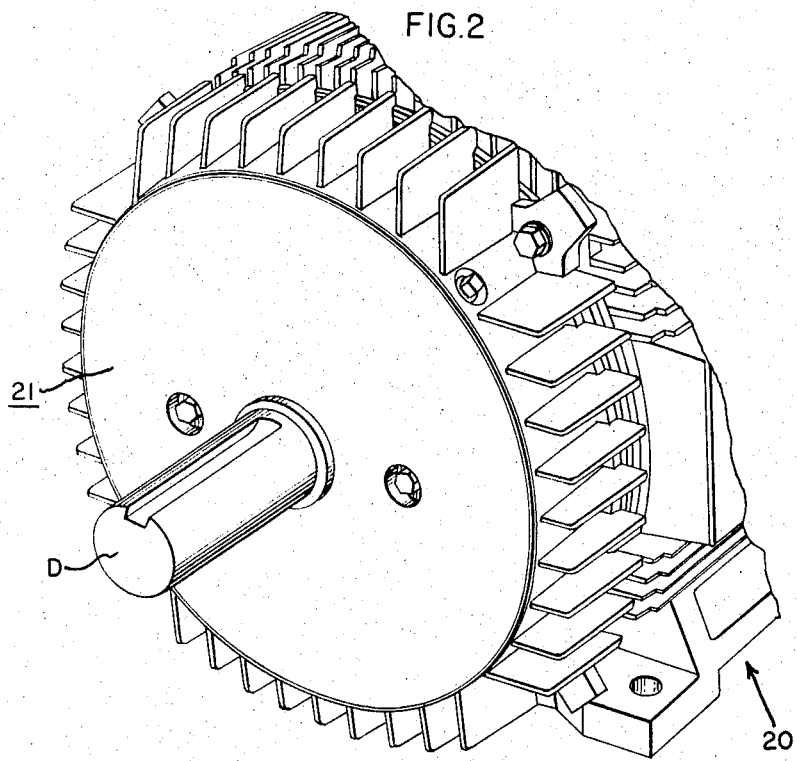
FIG. 2 is a fragmentary, perspective view of an electric motor having an end shield housing constructed pursuant to the teaching of the present invention.

Referring now to FIGS. 2-6 of the drawings, a preferred embodiment of the present invention will be described in detail. Since the present invention is primarily concerned with an improved lubricating means for an electric machine end shield housing, only the pertinent features of such a housing will be described herein. Of course, those skilled in the art will understand that the disclosed novel housing of the invention may be used on various conventional types of dynamoelectric machines, being mounted thereon in a relationship somewhat similar to that illustrated for the end shields 6 and 7 of the motor housing 10 of FIG. 1. Thus, as shown in FIG. 2, an end portion of a conventional dynamoelectric machine such as an electric motor 20 is provided with an end shield housing 21 secured to it in any conventional manner such as by a plurality of bolts. A drive shaft D that may be similar in structure to the drive shaft 5 shown in FIG. 1, is journaled in suitable bearings (not shown), which, again may be in the manner that is depicted in FIG. 1.

Figure 3:
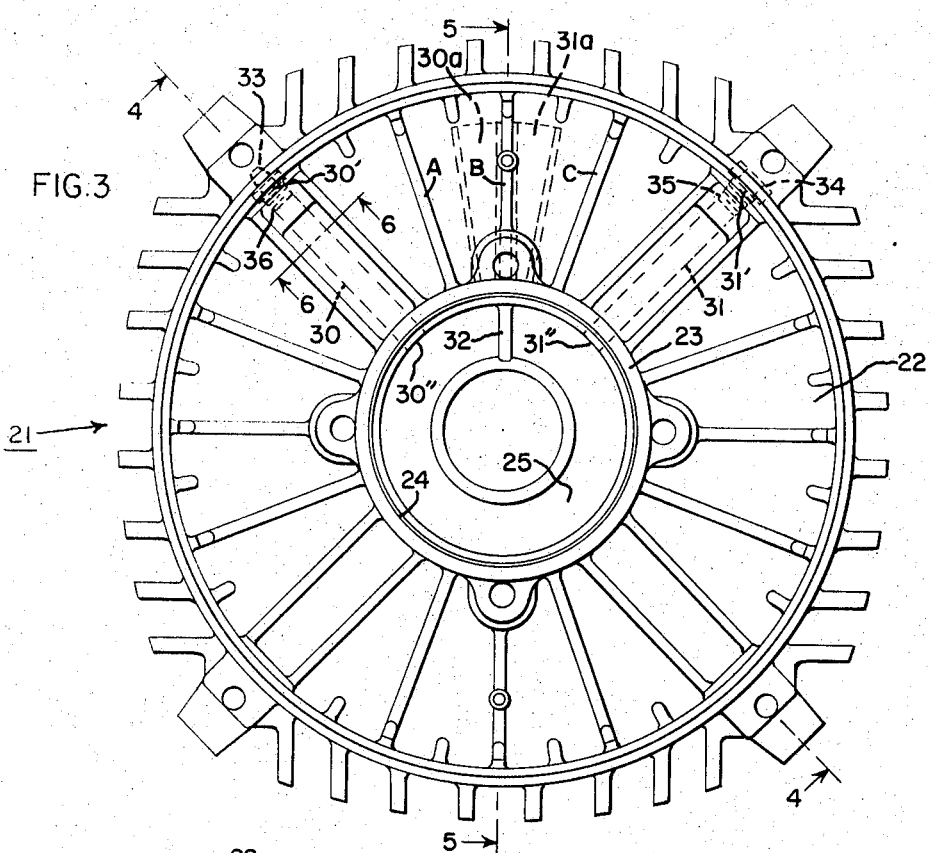
FIG. 3 is a plan view of the inner side of the motor end shield housing illustrated in FIG. 2.
Figure 4:
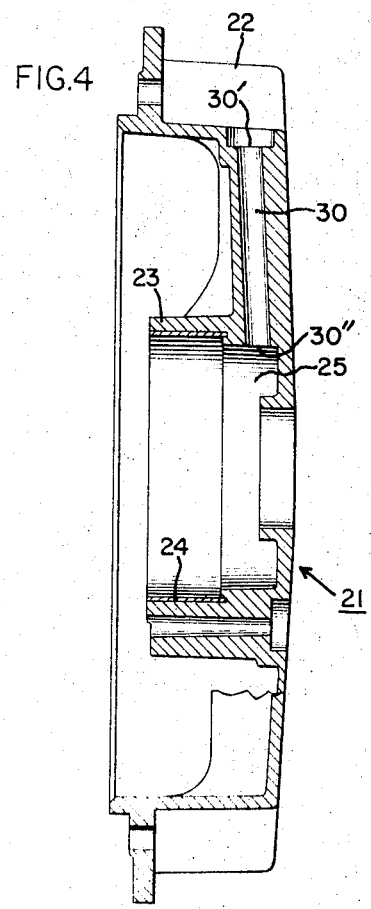
FIG. 4 is a side view of the end shield housing illustrated in FIG. 3, taken along the plane 4—4 shown in FIG. 3.
Figure 5:
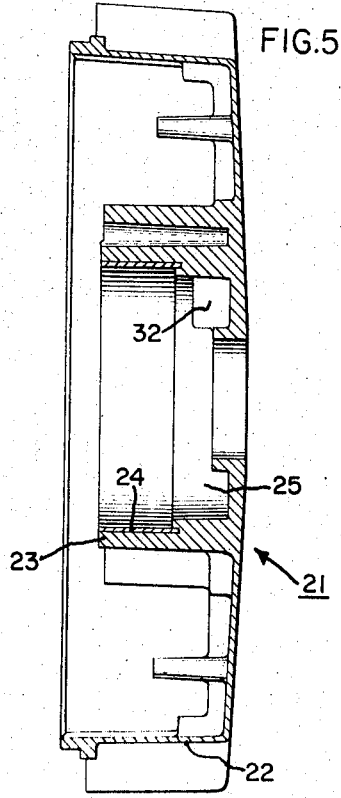
FIG. 5 is another cross-sectional view of the end shield shown in FIG. 3 taken along the plane 5—5 therein.

Referring now to FIG. 3, it will be seen that the inner side of end shield 21 is illustrated. This inner surface has a generally cup-shaped shield portion 22, which also can be seen in FIGS. 4 and 5. In addition, the end shield 21 is provided with an integral hub portion 23 centrally disposed thereon. As best seen in FIGS. 4 and 5, the hub portion 23 includes inner wall means that define a bearing mounting surface 24 and a lubricant storage well 25.

It should be understood that in its assembled, operating form, the bearing surface 24 will have mounted thereon a ball or roller bearing, such as the ball bearing 8 or 9 shown in the motor 1 illustrated in FIG. 1. Consequently, the lubricant storage well or chamber 25 will normally be substantially sealed when the end shield 21 is mounted in operating position around a drive shaft D, somewhat analogous to the way in which the lubricant storage chamber 12 of the motor 1 of FIG. 1 is enclosed.

Referring again specifically to FIG. 3 of the drawing, it will be seen that there is shown, pursuant to the present invention, a pair of elongated passageways 30 and 31 which extend respectively from arcuately displaced spaced-apart points 30' and 31' on the periphery of the end shield 21 to arcuately displace points 30" and 31" on the inner wall means defining the lubricant storage well 25. In the preferred embodiment of the invention, the passageways 30 and 31 are substantially straight but, as the description of the invention proceeds, it will be appreciated that alternative passageway configurations may be employed in other embodiments of the invention.

Figure 6:
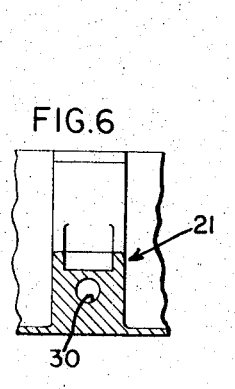
FIG. 6 is a fragmentary cross-sectional view taken along the plane 6—6 of FIG. 3, illustrating a cross-section of one embodiment of a lubricating passageway constructed according to the teaching of the present invention.

In order to maintain a desired rigidity of the generally cup-shaped end shield 21, a plurality of radially extending ribs A, B, C, et cetera are disposed between the hub portion 23 and the outer peripheral surface of the cup-shaped end shield member 21, as best seen in FIG. 3. It has been found that the lubricant receiving passageways 30 and 31 may ideally be formed between respective pairs of the reinforcing ribs by being molded integrally with the end shield 21. In such a molding operation, a pair of removable metal core pins (not shown) are disposed in the mold housing cavity for the end shield 21 to form the generally circular passageways. A cross-section of passageway 30 is shown in FIG. 6 of the drawing. Of course, other passageway configurations may be used to provide adequate access for lubricant to the storage well 25. It is important to note that the passageways 30 and 31, that are integrally molded in the end shield housing 21, extend to the outer periphery thereof without requiring any separate or additional extension tubes. Thus, the lubricating means of the invention are not subject to vibration that could result in increased noise being produced by the associated dynamoelectric machine during its normal operation.

An important feature of the present invention is the provision of a lubricant baffle 32 (also seen in FIG. 5) in the form of a generally rectangularly shaped vane that is rigidly positioned in the lubricant receiving well 25 by being mounted on the end shield 21. In fact, in the preferred embodiment of the invention, the vane 32 is integrally molded with the end shield 21. The lubricant baffle 32 is designed to restrict flow of lubricant in the well 25 parallel to the bearing mounting surface 24, and a bearing mounted therein. Toward that end, the baffle 32 should be restricted to a critical relative range of dimensions with respect to the width and depth of the bearing well 25 measured outward from the outer diameter of a drive shaft D, which is adapted to be inserted therethrough. Specifically, it has been found that the baffle 32 should obstruct at least two-thirds, but less than three-quarters, of the lubricant flow path parallel to the bearing mounting surface 24, defined by the walls of the lubricant receiving well 25. In theory, in order to assure the unidirectional flow of lubricant around the lubricant receiving well 25, it is necessary for the baffle 32 to block the flow of lubricant in more than one-half of the width of the storage well, but the foregoing critical range has been found to afford optimum lubricating efficiency for the lubricating means of the invention.

Referring again specifically to FIG. 3, it will be seen that the outer end of passageway 30 is closed with a grease inlet valve or grease fitting 33 that is mounted in standard threads 36 tapped in the outer end thereof. In like manner, the outer end of passageway 31 is sealed with a plug 34 removably mounted in threads 35 tapped in the outer end of passageway 31. The size of threads 35 and 36 is the same therefore it should be understood that the grease fitting 33 may be interchanged with the plug 34. This feature of the lubricating means of the invention is important because it assures optimum lubrication of the motor bearing for alternate locations of the inlet and relief fittings.

As noted at the outset, an important object of the present invention is to provide a dynamoelectric end shield with lubricating means that are readily accessible for maintenance from a single side of the end shield. Toward that end, the outer end of the lubricant receiving passageways 30 and 31 are situated at spaced-apart points on the periphery of end shield housing 21 that are displaced by an angle of 120° or less, pursuant to the invention. In fact, in the preferred embodiment of the invention, the spaced apart points 30' and 31' are approximately 90° away from one another on the periphery of shield 21. Suitable operation of the invention, in combination with the lubricant flow restricting effect of baffle 32, has been found with the outer ends of the passageways 30 and 31 spaced-apart in a range of angular displacement between 5° and 20° apart. Such an arrangement is illustrated in phantom in FIG. 3, to show alternative passageways 30a and 31a that have their inlet ports approximately 5° apart. Thus, it is apparent that with the invention it is possible to provide a pair of lubricant receiving ports that are readily accessible from a single side of a motor end shield while at the same time assuring optimum lubricating efficiency of a drive shaft supporting bearing that is lubricated from these passageways.

Those skilled in the art will appreciate that additional modifications and improvements of the invention may be made from the description of it that has been presented herein; accordingly, it is our intention to encompass within the limits of the following claims the true scope and spirit of the invention.

What we claim and desire to secure by Letters Patent of the United States is:

1. A dynamoelectric machine end shield housing having a generally cup-shaped shield portion and a centrally disposed hub portion, said hub portion including inner wall means defining a bearing mounting surface and a lubricant storage well disposed adjacent said surface, in combination with a bearing lubricating means comprising; means defining first and second lubricant receiving passageways that extend respectively from spaced-apart points on the periphery of said shield portion through it and said hub portion to spaced-apart points on said inner wall means, said spaced-apart points on the periphery being separated by an arcuate displacement of less than 120°, thereby to afford ready access to said passageways from a single side of said machine, and a lubricant baffle member mounted between said spaced-apart points on the inner wall means, said baffle member being operable to restrict but not completely block a flow of lubricant past it and said bearing surface.

2. An invention as described in claim 1 wherein said spaced-apart points on said inner wall means are displaced by an arcuate angle of less than 120°, and wherein said baffle is operable to cause at least a major portion of a lubricant disposed within said hub portion to flow around the lubricant storage well in a direction that causes it to traverse the arcuate angle outside of said spaced-apart-points on the inner wall means.

3. An invention as defined in claim 2 including a lubricant inlet valve removably mounted in the outer end of said first passageway, and further including a lubricant plug removably mounted in the outer end of the second passageway.

4. An invention as defined in claim 3 wherein said inlet valve and plug are interchangeably mountable in either of said passageways.

5. An invention as defined in claim 2 wherein the respective longitudinal axes of said passageways define an angle of approximately 90°.

6. An invention as defined in claim 2 wherein the outer spaced-apart points intersected on the periphery of said end shield housing by the passageways are situated within a range of arcuate angles between 5° and 20° apart.

7. An invention as defined in claim 2 wherein said passageways are each greater than 5 inches in length and are formed by casting the end shield housing around a pair of removable core pins.

8. An invention as defined in claim 2 wherein said baffle comprises a vane mounted on said shield portions to project radially inward from the inner wall means of said hub portion, said vane being sufficiently large to block flow of lubricant in more than one-half of the width of the storage well between said bearing mounting surface and said end shield portion.

9. An invention as defined in claim 8 wherein said baffle obstructs at least two-thirds, but less than three-quarters, of the lubricant flow area between said bearing mounting surface and said end shield portion of the shield housing, thereby to assure essentially unidirectional flow of lubricant parallel to said bearing mounting surfaces.

* * * * *

UNITED STATES PATENT OFFICE
CERTIFICATE OF CORRECTION

Patent No. 3,833,276      Dated Sept. 3, 1974

Inventor(s) Frederick William Baumann and Albert Rayner

It is certified that error appears in the above-identified patent and that said Letters Patent are hereby corrected as shown below:

Please restore the proper name of one of the inventors to that shown in the original application; specifically, please change the name "Albert Rayner" to "Albert Rayner Miller."

Signed and sealed this 19th day of November 1974.

(SEAL)
Attest:

McCOY M. GIBSON JR.       C. MARSHALL DANN
Attesting Officer      Commissioner of Patents